US009308665B2

(12) United States Patent
Ballmer

(10) Patent No.: US 9,308,665 B2
(45) Date of Patent: Apr. 12, 2016

(54) METHOD AND APPARATUS FOR PREPARING LOGS FOR A LOG STRUCTURE

(76) Inventor: Dusko Ballmer, Summerstown (CA)

(*) Notice: Subject to any disclaimer, the term of this patent is extended or adjusted under 35 U.S.C. 154(b) by 1355 days.

(21) Appl. No.: 13/060,894

(22) PCT Filed: Aug. 25, 2008

(86) PCT No.: PCT/CA2008/001492
§ 371 (c)(1),
(2), (4) Date: May 13, 2011

(87) PCT Pub. No.: WO2010/022493
PCT Pub. Date: Mar. 4, 2010

(65) Prior Publication Data
US 2011/0213595 A1    Sep. 1, 2011

(51) Int. Cl.
G06F 17/50 (2006.01)
B27B 1/00 (2006.01)
G05B 19/401 (2006.01)

(52) U.S. Cl.
CPC .............. *B27B 1/007* (2013.01); *G05B 19/401* (2013.01); *G05B 2219/35162* (2013.01); *G05B 2219/37047* (2013.01); *G05B 2219/37205* (2013.01); *G05B 2219/45205* (2013.01)

(58) Field of Classification Search
None
See application file for complete search history.

(56) References Cited

U.S. PATENT DOCUMENTS

| 2003/0066574 A1 | 4/2003 | Lovchik et al. |
| 2004/0182023 A1* | 9/2004 | Chambers ........................ 52/233 |
| 2006/0260264 A1 | 11/2006 | Reynolds |
| 2007/0119518 A1 | 5/2007 | Carman et al. |

FOREIGN PATENT DOCUMENTS

| WO | 2009139638 A2 | 11/2009 |
| WO | WO 2009/139638 | * 11/2009 |

OTHER PUBLICATIONS

Lundgren, C. "Predicting Log Type and Knot Size Category Using External Log Shape Data from a 3D log scanner", 2000, Scand. J. For. Re. 155, pp. 119-126.*
Occena, L.G. "Computer Integrated Manufacturing Issues Related to Hardwood Log Sawmill", Journal of Forest Engineering, pp. 39-45.*
Graphisoft, Archilogs webpage, 4 pages, accessed on Sep. 28, 2015, http://www.mad.fi/mad/logs.html.*
Graphisoft, "Archilogs—Log home design made easy—one program does it all", Jun. 26, 2013, 4 pages.*
Graphisoft, "Graphisoft Delivers Intergrated CAD/CAM Solution for the US Log Home Industry", Jun. 2, 2000, 2 pages.*
International Search Report for PCT/CA2008/001492 dated Apr. 30, 2009 (Form PCT/ISA/210).
Written Opinion of the International Searching Authority for PCT/CA2008/001492 dated Apr. 30, 2009 (Form PCT/ISA/237).
Suppemental European Search Report dated Sep. 12, 2012.

* cited by examiner

*Primary Examiner* — Suzanne Lo
(74) *Attorney, Agent, or Firm* — Buchanan Ingersoll & Rooney

(57) ABSTRACT

A method of preparing a log comprising scanning the log, matching the scanned log to a virtual log, generating a cutting profile for the scanned log from the matched virtual log and cutting the log in accordance with the generated cutting profile. A method for preparing a log structure including a plurality of logs. The method comprising scanning the logs, generating a cutting profile associated with each log, cutting each of the logs according to the associated cutting profile and, assembling the log structure with the cut logs. A system for preparing logs, the system comprising a scanning subsystem, a machining subsystem and, a CAD design subsystem.

18 Claims, 16 Drawing Sheets

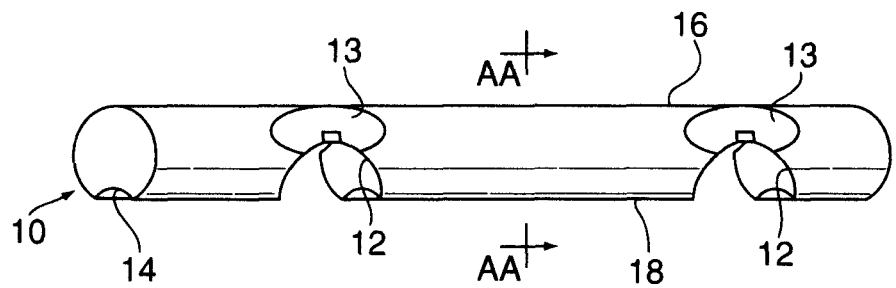
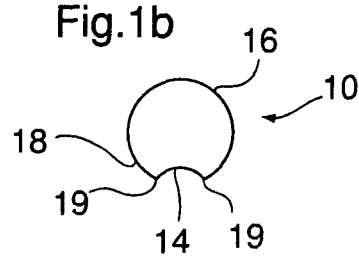
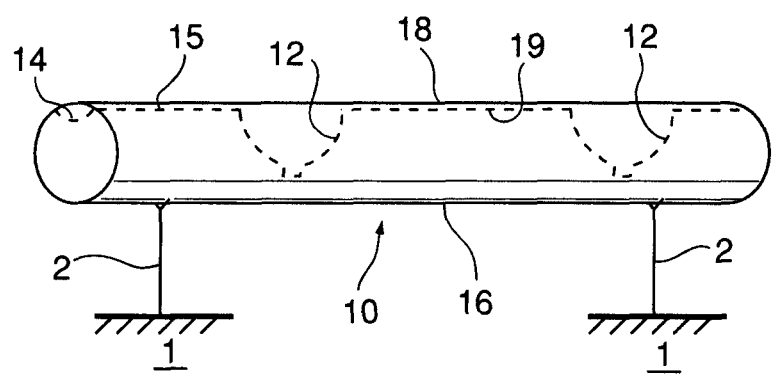
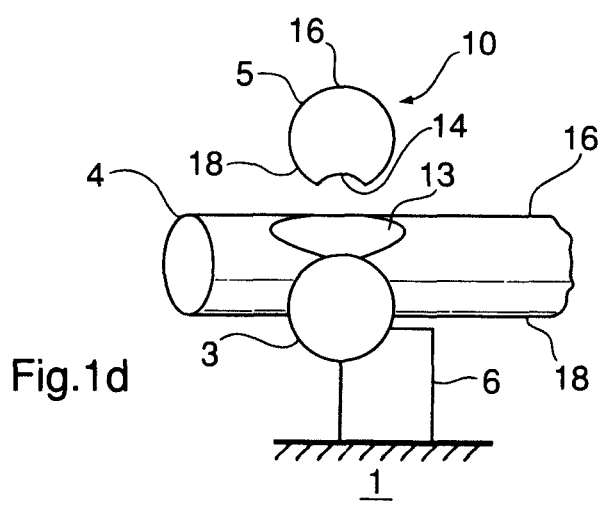
Fig.1a
Fig.1b
Fig.1c
Fig.1d

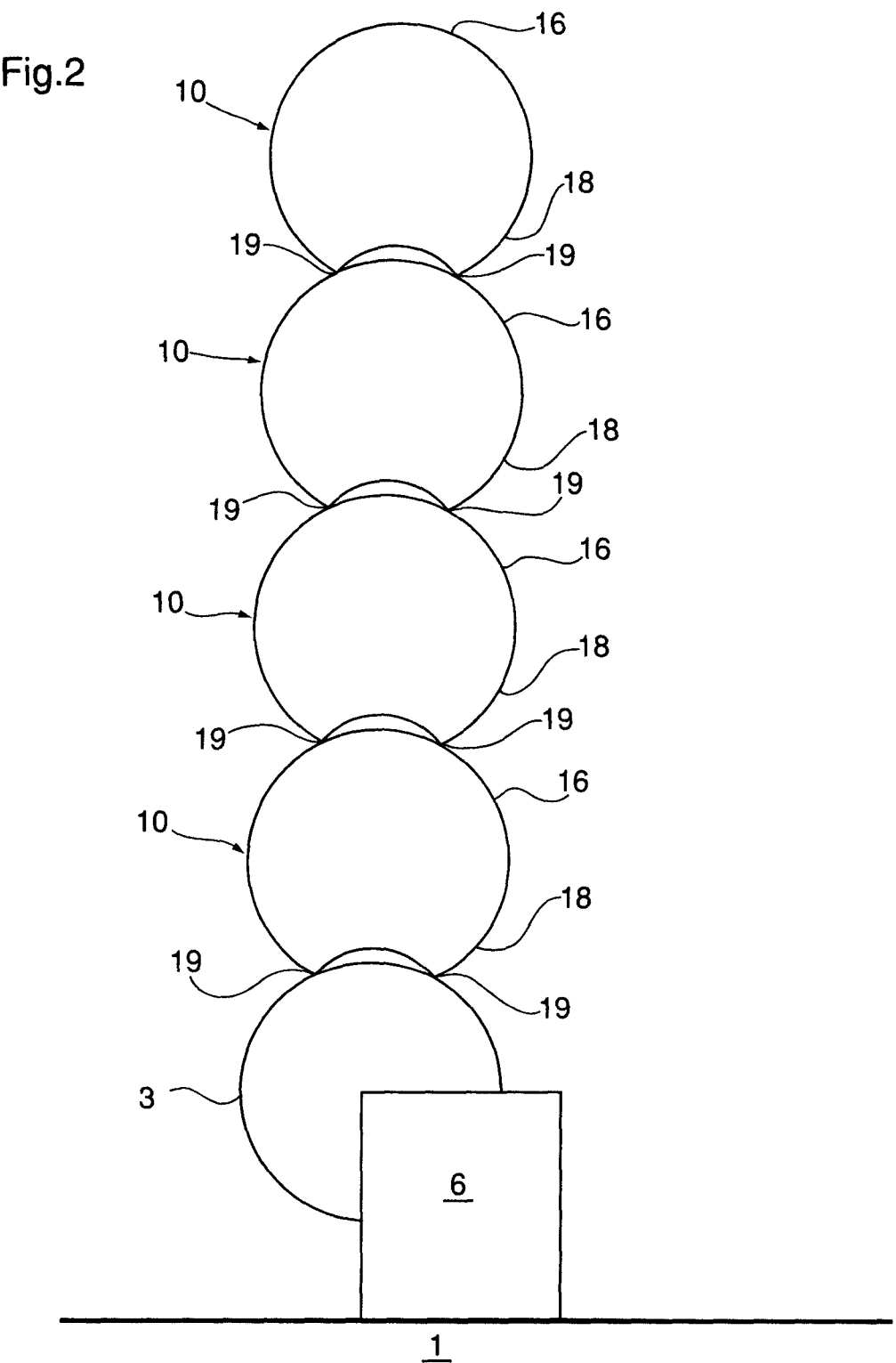

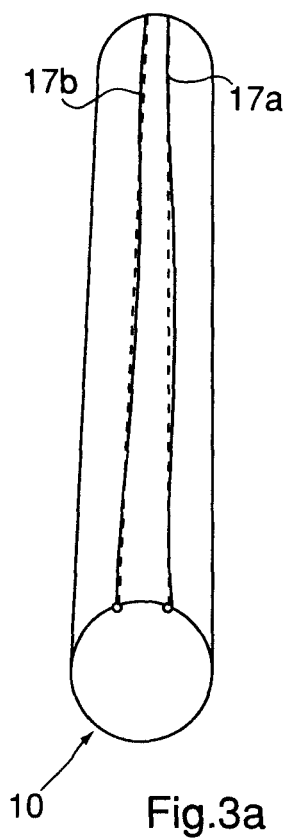
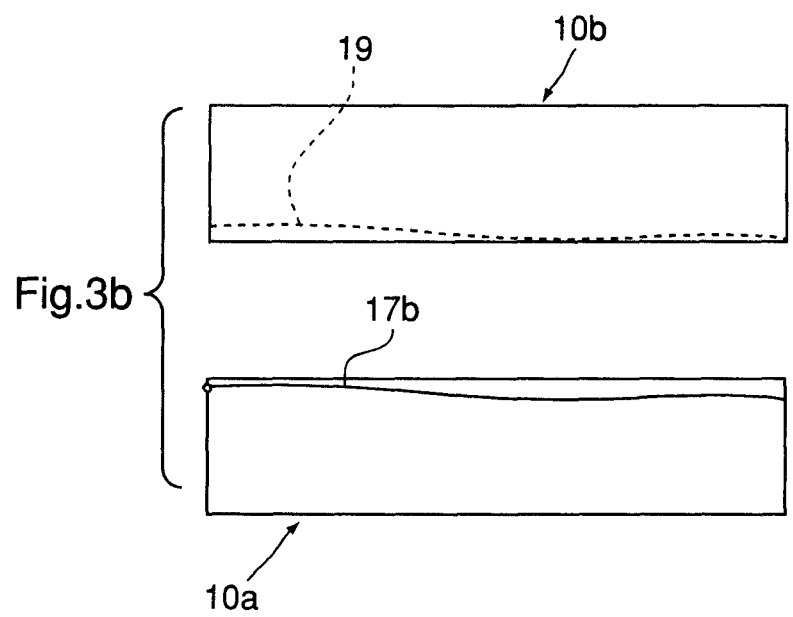
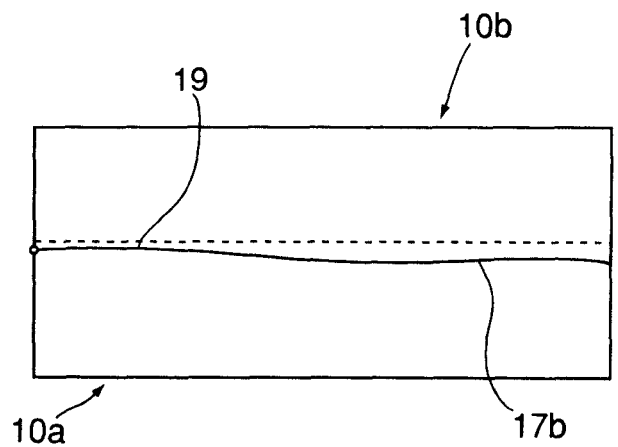

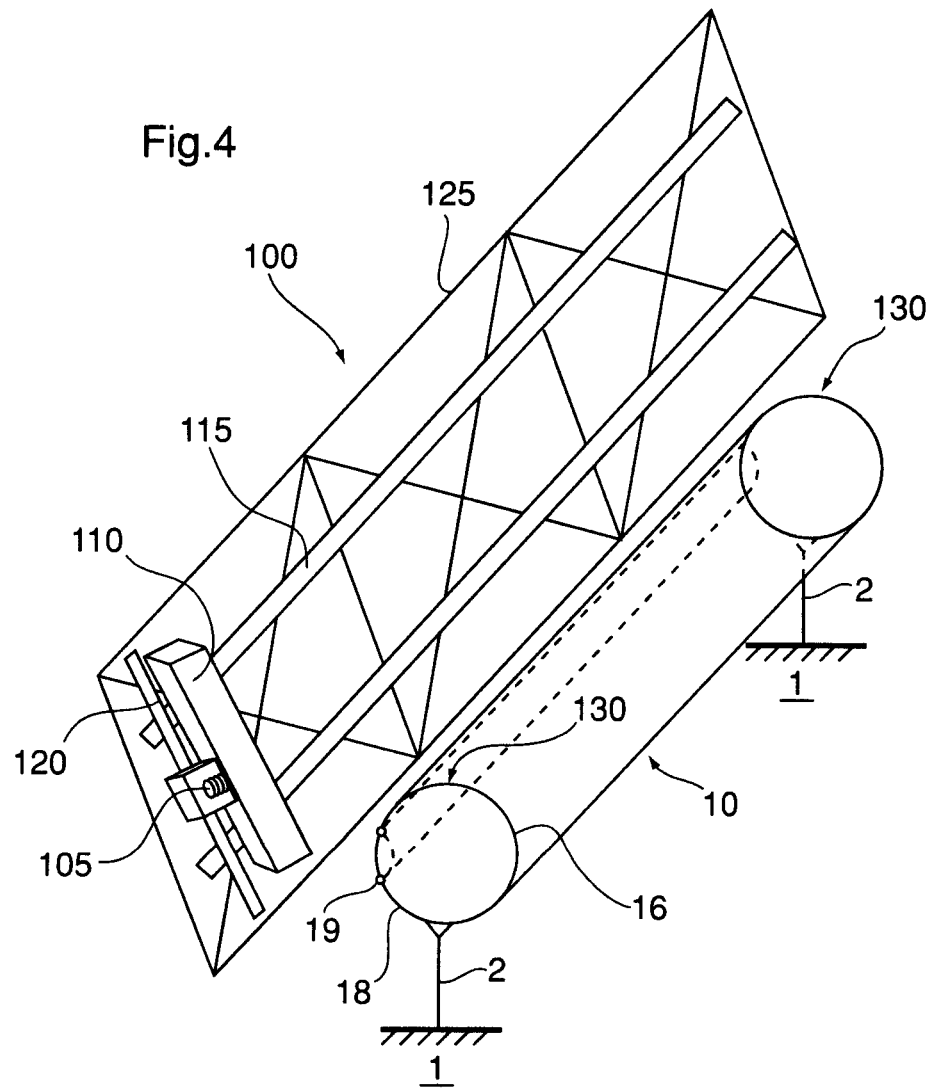

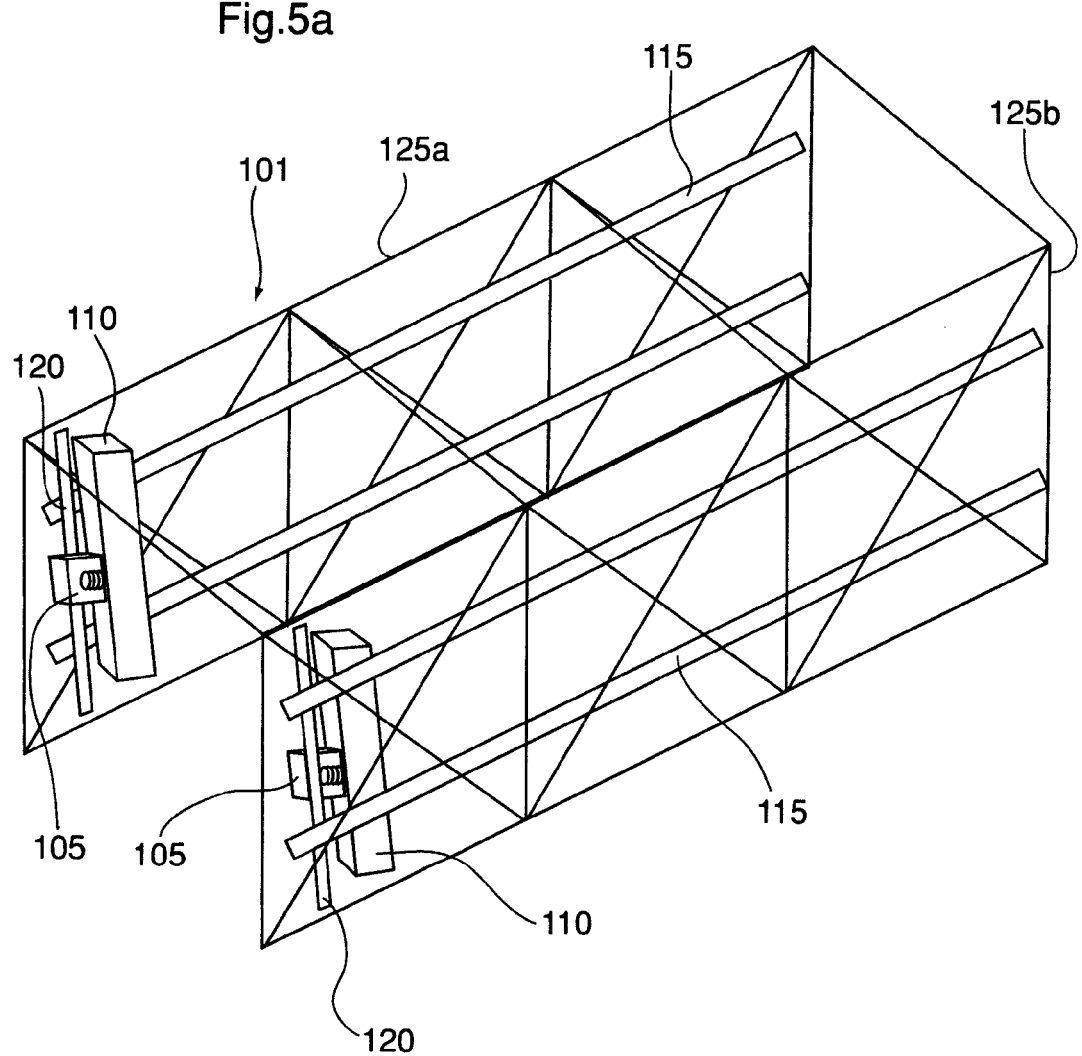

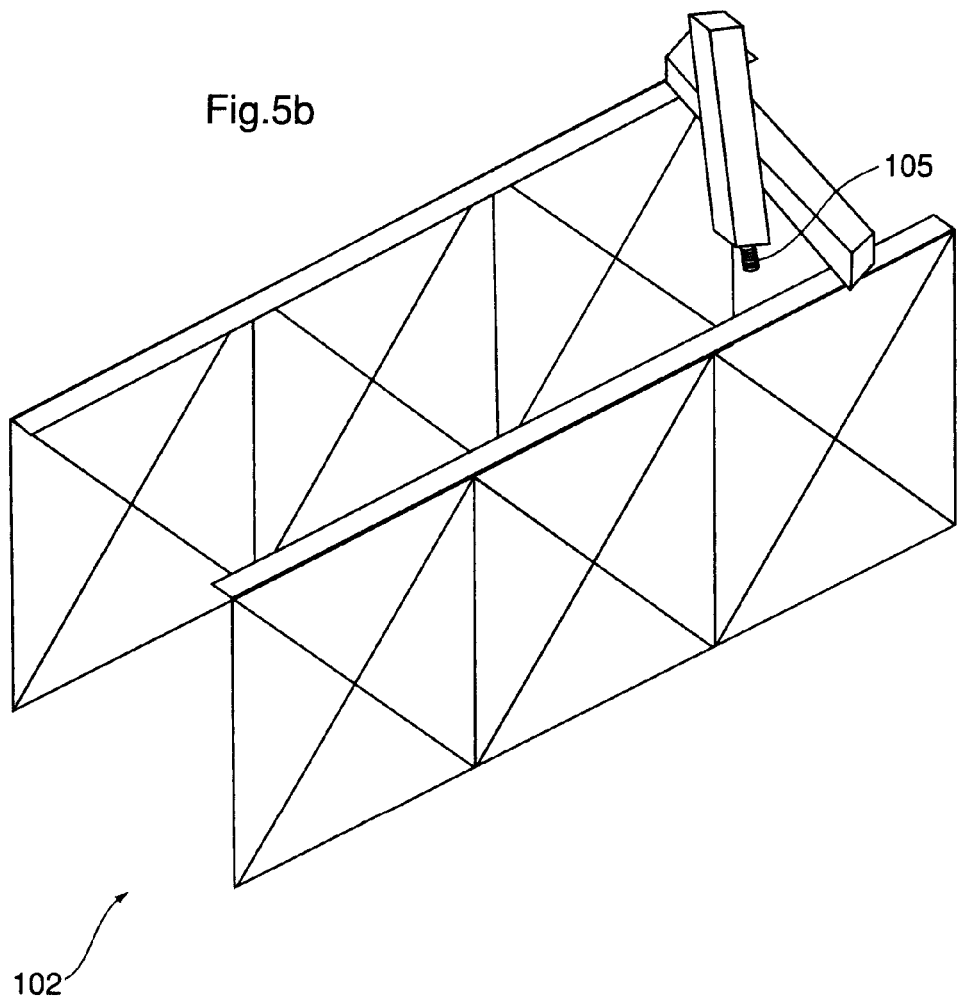

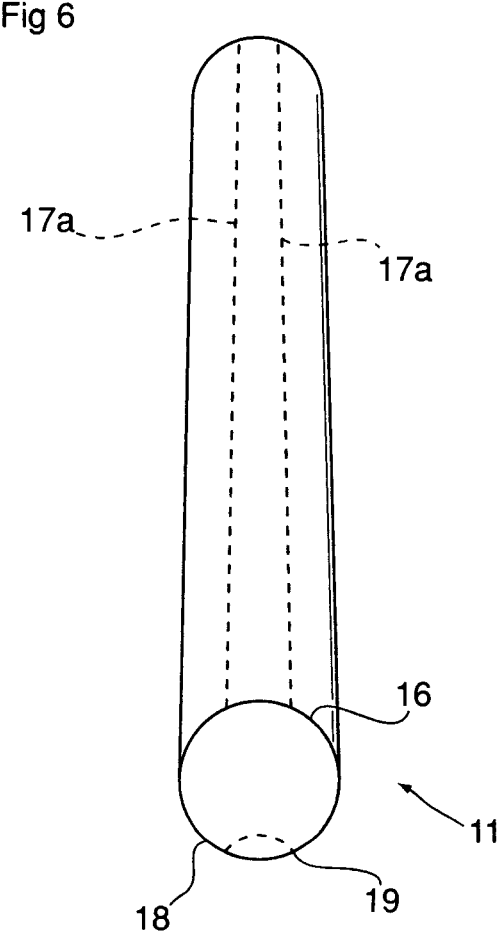

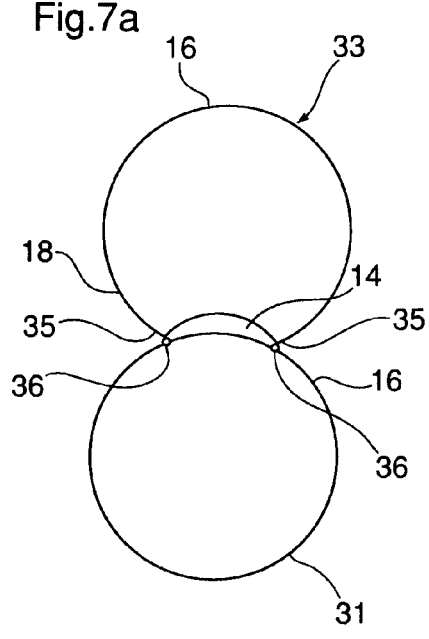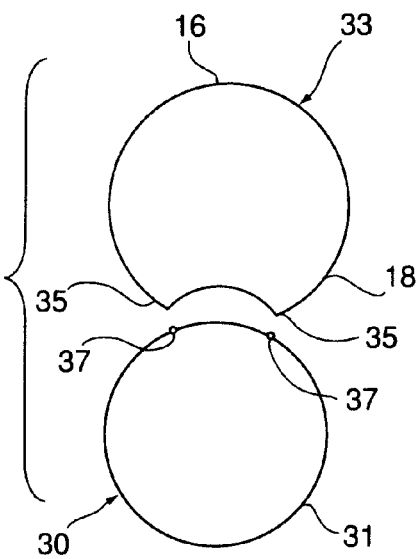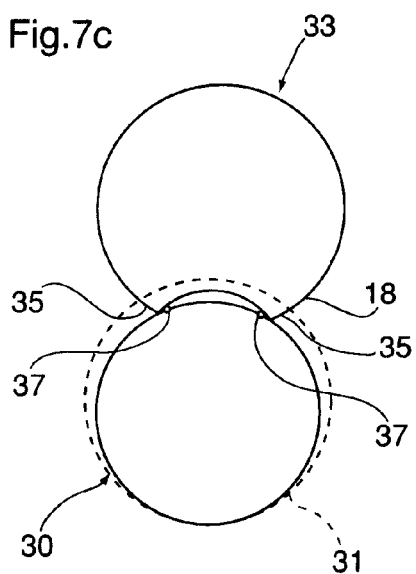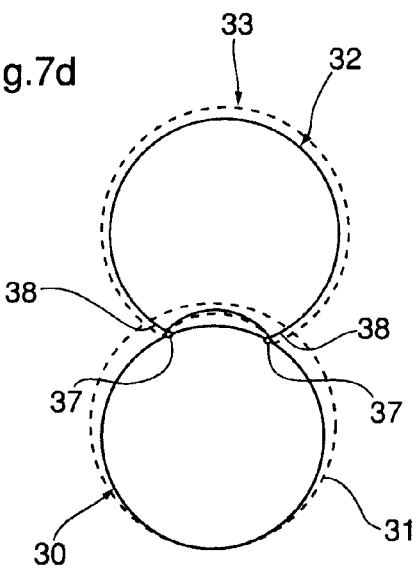

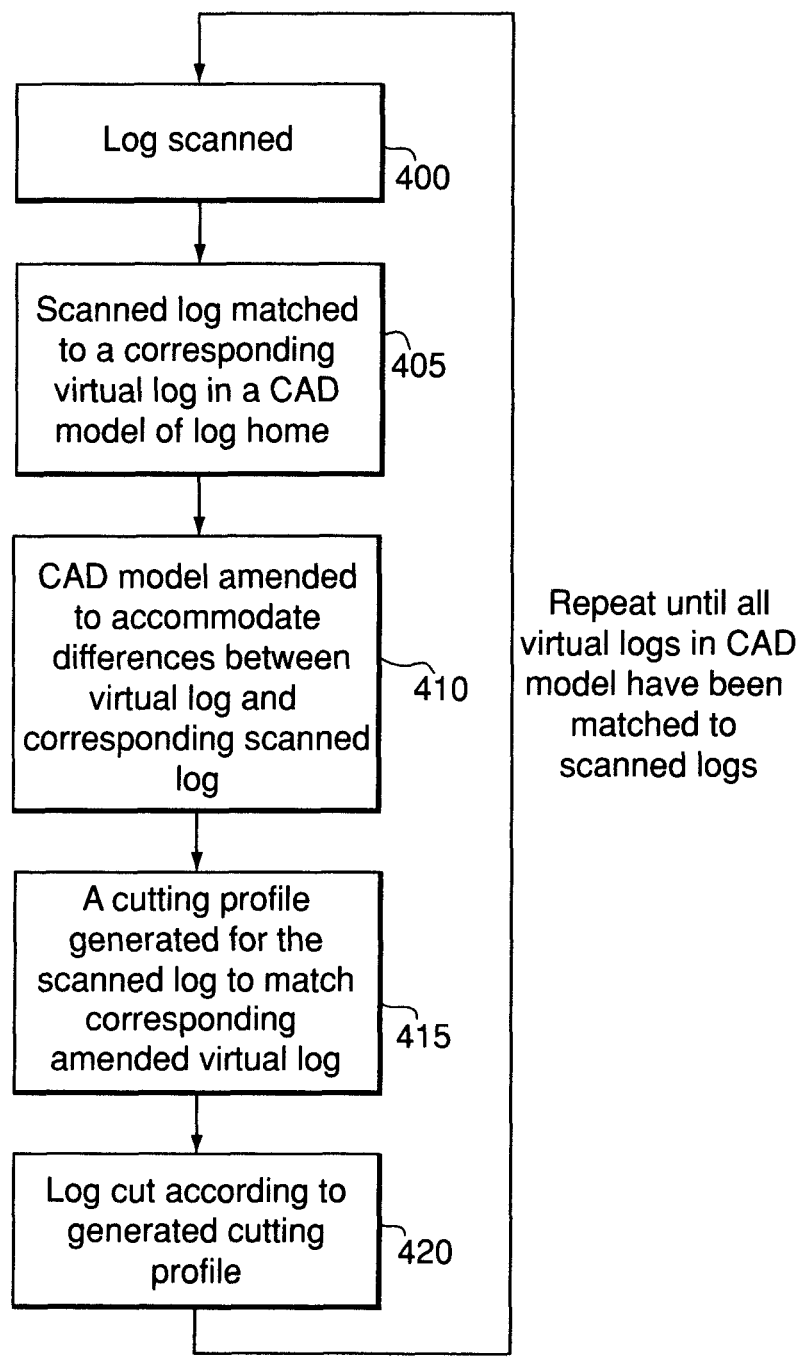

METHOD AND APPARATUS FOR PREPARING LOGS FOR A LOG STRUCTURE

CROSS-REFERENCE TO RELATED APPLICATIONS

This application is the United States national phase under 35 U.S.C. §371 of PCT International Patent Application No. PCT/CA2008/001492, filed on Aug. 25, 2008. This application is incorporated by reference herein.

FIELD OF THE INVENTION

The invention relates to handcrafted log structures. In particular, the invention relates to handcrafted log homes and a method and apparatus for preparing logs to construct a handcrafted log home.

BACKGROUND OF THE INVENTION

In prior art methods of constructing handcrafted log homes, logs are cut in position to assemble the log home. In order to match the cuts to each individual log and its neighbouring log, each log is individually positioned above a previously laid log. Workers scribe the newly positioned log along its length to match the contours of the adjacent lower log. The workers hand cut a face of the log along the scribe lines to match the contours of the bearing face of the adjacent lower log. Similarly, saddles are scribed and cut in the faces at ends of the log to match the saddles or outer contour of interfitting logs. The log is then lowered into place on the previously laid log. The next log is than positioned above the previously cut log and the process is repeated until all logs have been cut and assembled into a complete log home. Similarly, ceiling joists are hoisted into position, marked and cut to fit in place. Other cuts may also be made to the logs at the construction site, such as openings for windows or doors. A majority of these cuts require the logs to be positioned adjacent to at least one neighbouring log, marked to match, and then hand cut to fit in place.

The cutting and assembly may either take place at the intended site of the log home, or at a remote processing site. In the latter case, the logs are disassembled and shipped as a "kit" to the intended site for final assembly and finishing.

This process of constructing a log home is extremely time consuming and laborious. Large heavy logs need to be sorted and cut in sequence as the log home is assembled. Each log is first pre-positioned to scribe to match the dimensions of the previously laid log, hand cut along the scribe lines and then positioned in place on the previously laid log. Adjustments to the fit of adjacent logs need to be made to ensure a good fit between logs.

Matching the contact edges of a log to the bearing face of a previously laid log is a difficult and time-consuming process that requires a skilled worker. Deviations in the matching lead to gaps that can allow ingress of the elements, create less-than-optimal thermal insulation of the log home and possibly lead to instability in the log home.

Previous efforts to automate the process have involved machining logs to common fixed external dimensions and then cutting joints and bearing surfaces into the machined logs. Typically, such methods machine the logs to either a square or a circular external profile, and all logs are machined to the same external dimensions. Such methods are wasteful in that logs are typically machined down to the smallest average log side. Such methods are also less attractive than handcrafted log homes in that logs lose their natural, irregular profile.

There is a need for a method and apparatus for preparing logs to construct log structures such as handcrafted log homes that allows for cutting logs out of order with their placement within a log home. There is a further need for a method and apparatus for preparing logs to construct handcrafted log homes that allows for adjustment of the cutting of an individual log to accommodate the overall needs of the planned log home. There is a further need for a method and apparatus for preparing logs to construct handcrafted log homes that allows for cutting of all logs without requiring assembly of the log home.

BRIEF DESCRIPTION OF THE DRAWINGS

In drawings which illustrate by way of example only a preferred embodiment of the invention, FIGS. 1a-d are illustrations showing logs cut to fit for assembly in a handcrafted log home.

FIG. 2 illustrates a cross-section through a wall of a log home.

FIGS. 3a-3c illustrate matching engaging surfaces between two adjacent logs.

FIG. 4 illustrates a machine tool for machining a log.

FIGS. 5a and 5b illustrate alternate machine tools for machining a log.

FIG. 6 illustrates a plan of an ideal virtual log.

FIGS. 7a-7d illustrate adjusting plans of ideal virtual logs to accommodate the dimensions of actual logs.

FIG. 11 illustrates a further embodiment of a process for cutting logs.

DETAILED DESCRIPTION OF THE INVENTION

Figure 8:
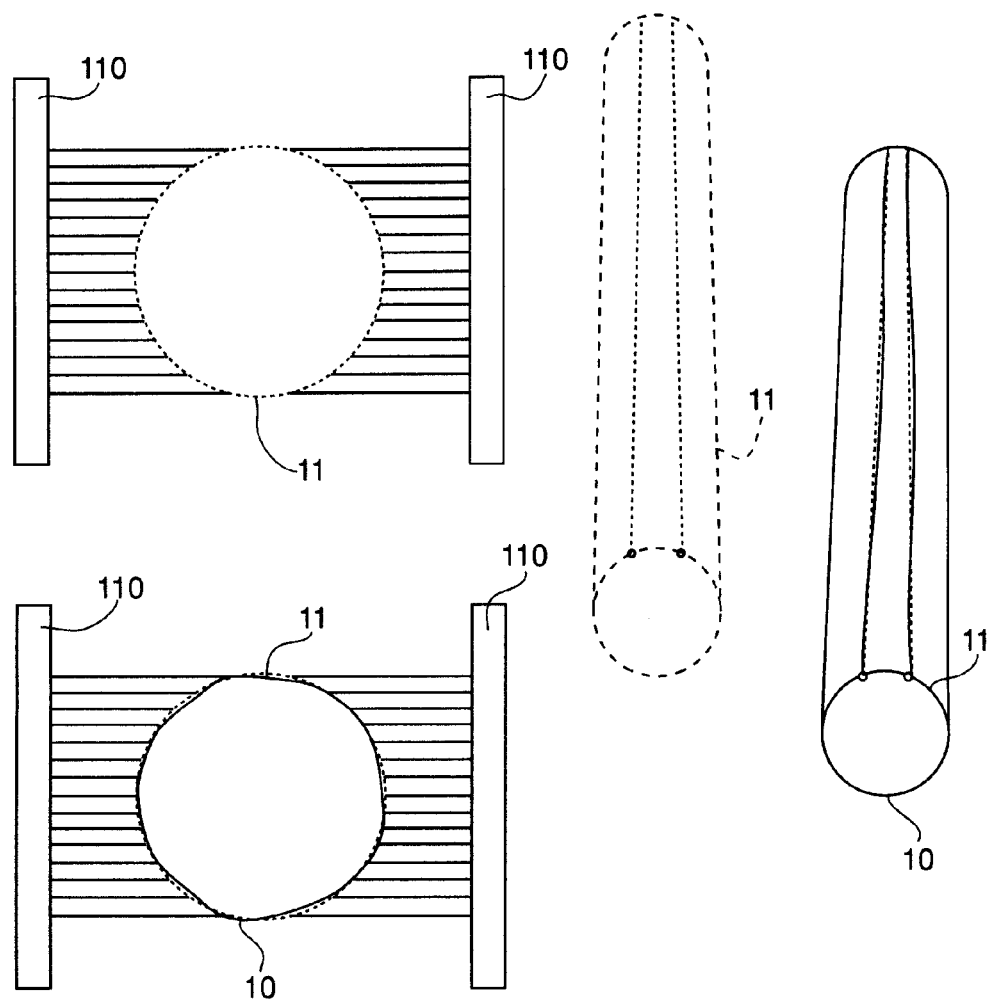
FIG. 8 illustrates measurement of an ideal virtual log and comparing a measured log with an ideal virtual log.

In an embodiment a method is provided for preparing a log comprising: scanning the log; matching the scanned log to a virtual log; generating a cutting profile for the scanned log from the matched virtual log; cutting the log in accordance with the generated cutting profile. In an embodiment the virtual log comprises one of a plurality of virtual logs in a CAD model of a log structure. In an embodiment a plurality of logs are each scanned and matched to a corresponding virtual log from the plurality of virtual logs.

In an embodiment a method is provided for preparing logs for a log structure, the method comprising: scanning the logs; storing the scanned logs in a log library; designing a CAD model of a log structure using scanned logs from the library; generating a cutting profile for each of the scanned logs in the CAD model; and cutting the scanned logs in accordance with the cutting profiles. In an embodiment an identifier is associated with each of the logs and storing the identifier with the scanned log in the library.

In an embodiment a system is provided for preparing logs, the system comprising: a scanning subsystem; a machining subsystem; and, a CAD design subsystem. In an embodiment the scanning subsystem and the machining subsystem comprise separate subsystems. In an embodiment at least one of the scanning subsystem and the machining subsystem comprise a mobile subsystem. In an embodiment the CAD design subsystem is geographically remote from at least one of the scanning subsystem and the machining subsystem. In an embodiment the scanning subsystem and the machining subsystem comprise a single 5-axis CNC router.

In an embodiment a method is provided for preparing a log structure including a plurality of logs, the method comprising: scanning the logs; generating a cutting profile associated with each log; cutting each of the logs according to the associated cutting profile; and, assembling the log structure with the cut logs.

In an embodiment the cutting profile comprises a scribing profile and the step of cutting the log comprises scribing the log according to the scribing profile.

In an embodiment, a method is provided where a log is measured. The measured log is then compared to a planned log dimension from a plurality of log dimensions in a log home model. Differences between the measured log and the planned log dimension are used to create a cutting profile for the measured log. A machine tool may then cut the measured log according to the cutting profile to create a cut log. In an embodiment a model of planned log dimensions may be updated to replace the planned log dimension with the measured log dimension as cut by the machine tool, and adjust the plan to recompute the remaining planned log dimensions to account for the measured log dimension as cut by the machine tool.

In an embodiment a method is provided where a plurality of logs are measured. The plurality of measured logs may be virtually machined and assembled in a CAD/CAM program to create a planned log home model. A machine tool may then cut each of the plurality of logs according to a cutting profile generated for each log from the model.

In an embodiment, a system and method is provided for creating a handcrafted log home having machined joints and bearing surfaces while retaining the natural contours of the logs.

In an embodiment, a method is provided where a log is measured. The measured log is then compared to a planned log dimension from a plurality of planned log dimensions in a log home model. Differences between the measured log and the planned log dimension are used to create a scribing profile for the measured log. A scribing tool may then mark the measured log according to the scribing profile to create a scribed log. The scribed log may then be cut by hand using the scribe markings on the scribed log without first positioning a log above a previous log and hand-scribing the positioned log to match the contours of the previous log. In an embodiment the scribed log may be transported to a building site remote from the scribing location, cut and then assembled into a log home constructed at the building site.

Referring to FIG. 1a is a representative log 10 that would make up part of a wall in a log home. In the embodiment, the log 10 is being prepared to create saddle-notch corners in the constructed log home. As illustrated in FIG. 1a, the log 10 has saddle-notches 12 at each end of the log 10 and a saddle 13 opposite each saddle-notch 12 to accommodate the saddle-notch 12 of the next log in the wall. The saddle-notch corners illustrated are an embodiment of log home construction used to allow the overlay and inter-fit of logs 10 that form intersecting walls in the log home. Illustration of a particular type of joint that may be employed is intended to assist in understanding the system and method and is not intended to limit the present system and method to that jointing and technique, and all suitable log home constructions joints are contemplated.

The log 10 may be described as having a top bearing face 16 and a bottom cut face 18. The bearing face 16 supports superior logs in the wall, while the cut face 18 rests upon and engages with the adjacent lower log 10 in the wall.

FIG. 1b is a section view of the log 10 in FIG. 1a taken along section line AA. In the example illustrated, the log 10 has a top bearing face and a bottom cut face 18. The cut face 18 has a channel 14 cut along the length of the log forming edges of contact 19 that are intended to engage with the bearing face 16 of the adjacent lower log 10 in the wall.

FIG. 1c illustrates a log 10 resting on supports 2 for supporting the log 10 during shaping of the cut face 18. As illustrated the log 10 is positioned upside down to provide access to the cut face 18 during the shaping operation. A scribe line 15 is shown on the outer surface of the log 10 for indicating the cuts to create the channel 14 and saddle-notches 12 to match a previously cut and positioned log.

FIG. 1d is an illustration of a corner of a log home during construction. As illustrated a base log 3 rests on a foundation 6, typically above the ground 1. A base log 4 for an intersecting log rests upon the outer surface of log 3. Since the base logs 3, 4 do not rest on lower logs 10, the cut face 18 of the base logs 3, 4 need not include a channel since there are no edges of contact 19.

A superior log 5 is illustrated in position for lowering onto base logs 3, 4. Superior log 5 is positioned generally parallel to base log 3 with one saddle-notch 12 aligned with the outer contour of base log 4, at the illustrated end of superior log 5, and the other saddle-notch 12 aligned with the outer contour of a matching base log 4 at the other end of superior log 5 (not illustrated in this view. The cut face 18 of superior log 5 is oriented facing down to engage with the bearing face 16 of base log 3 along edges of contact 19. Insulation (not shown) may be positioned in the channel 14 before lowering superior log 5 onto base logs 3, 4.

Saddle-notches 12 and saddles 13 provide for interlocking of the logs 10 of intersecting walls, as well as to expose the denser heartwood of the logs 10 to provide structural support at the points of intersection. In the following figures saddle-notches 12 and saddles 13 may be omitted to simplify the drawings, however they are understood to be included as necessary.

FIG. 2 illustrates a section view of a wall showing a series of logs 10 stacked in position on a base log 3 supported by a foundation 6 resting on the ground 1. As illustrated the logs 10 each engage an adjacent inferior log 10 along edges of contact 19. In the simplified illustration the logs 10, 3 are illustrated as being circular in cross-section with the channel 14 removed from the cut face 18. As will be appreciated, in reality logs 10 are not circular and vary in cross-section along their length. Accordingly the contours of the edges of contact 19 must be shaped to match the contours of the bearing face 16, or vice versa.

FIG. 3a illustrates a log 10 with ideal straight bearing edges 17a illustrated as stippled lines. As mentioned above, in reality the cross-section of a log is not circular and varies along its length. As a result, actual bearing edges 17b vary from the ideal straight bearing edges 17a. FIG. 3b illustrates a lower log 10a with bearing edges 17b. An upper log 10b is illustrated above the lower log 10a prior to shaping. The upper log 10b must be shaped to match intended edges of contact 19 with the bearing edges 17b of the lower log 10a. FIG. 3c illustrates the logs 10a, 10b after shaping of the upper log 10b, with the upper log 10*b* positioned in place above lower log 10*a* and the edges of contact 19 engaging with the bearing edges 17*b*.

In an embodiment illustrated in FIG. 4, an automated machine tool 100 may be used to prepare a log 10 for assembly in a log home. In the embodiment illustrated a log 10 may be positioned on supports 2 and fixed in place, for instance with clamps 130. The machine tool 100 may comprise a frame 125 extending at least the length of the log 10 intended to be cut. Rails 115 extending the length of the frame 125 allow for a scanner 110 and a cutter 105 to travel the length of the log 10. Vertical rails 120 allow for a second degree of freedom for the cutter 105. The cutter 105 includes a z-axis to provide at least a third degree of freedom. Depending upon the types of cuts to be performed, the cutter 105 may additionally be provided with rotary adjustment to allow for more complex cutting profiles. The scanner 105 may be a line scanner, as illustrated, that scans the full width of the log at each position along the rails 125. Alternatively, scanner 105 may also be mounted on vertical rails 120 to allow for repositioning of the scanner in two dimensions. In an embodiment scanner 105 may comprise a line scanner having ends at an angle to the central portion of the scanner 105. Such an embodiment allows for more than 180° of the log 10 to be scanned by the scanner 105.

The machine tool 100 proceeds by scanning the length of the log 10 to build a map of the cut face 18 of the log 10. The map of the cut face 18 may be compared to a bearing face 16 of a previously scanned log 10. A cutting profile may be generated to match a machined cut face 18 to the compared bearing face 16, and specifically to match machined edges of contact 29 to bearing edges along the compared log 10. The machine tool 100 may then machine the cut face 18 according to the cutting profile to produce a machined log.

In an embodiment the scanned surfaces of the log 10 may be combined to create a complete 3D map of the log 10. In an alternate embodiment the scanned surfaces comprise only a portion of the periphery of the log 10. The portion of the periphery comprises the portions of the log 10 that need to be cut. In an alternate embodiment the log 10 may be rotated about its longitudinal axis in front of a scanner to scan the periphery of the log 10. The scanner may be indexed along the length of the log 10 in increments to capture the periphery along the full length of the log 10.

In an embodiment, as illustrated in FIG. 4, the machine tool 100 may comprise a frame supporting a single scanner 110 and cutter 105. In the embodiment of FIG. 4 the log 10 must be re-positioned to orient the bearing face 16 toward the frame 125 to allow the scanner 110 to scan the bearing face 16.

In the embodiment described above, only the cut face 18 is machined by the machine tool 100 to machine the channel 14 and saddle-notches 12. In an alternate embodiment the bearing face 16 may also be machined to machine the saddles 13 and optionally provide machined bearing edges 27 that match an "ideal" surface for receiving the machined edges of contact 29 (not shown in this view). In this embodiment the machined edges of contact 29 are matched to the machined bearing edges 27, instead of the bearing face 16. Use of machined edges of contact 29 provides for some leeway in accommodating logs of different diameter within a CAD model, as described further below.

FIG. 5*a* illustrates an embodiment where machine tool 101 comprises a pair of opposed frames 125*a*, 125*b*. In the embodiment of FIG. 5 two scanners 110 and cutters 105 are provided to permit scanning and machining of opposed faces of a log 10 without requiring repositioning of the log 10.

FIG. 5*b* illustrates a further embodiment where machine tool 102 comprises a multi-axis CNC router 102. In the embodiment of FIG. 5*b* the CNC router 102 may be employed to machine faces 16, 18 of a log 10. Depending upon the degree of freedom of the router 102, the log 10 may need to be repositioned to provide access to both faces 16, 18. Preferably, however, a router 102 will have sufficient freedom to machine both faces 16, 18 without repositioning the log 10. The log may either be positioned with faces 16, 18 arranged vertically, or horizontally opposed as best suits the capability of the router 102.

In the embodiment of FIG. 5*b*, preferably the machine tool 102 may be provided with a rotary mount for fixing and rotating the log 10 in place. In such an embodiment, the log 10 may rest upon a support that allows for rotation while resisting lateral or downward motion, such as pairs of spaced apart rollers. In this embodiment the log may be scanned by rotating the log and traversing a scanner down the length of the log 10. Accordingly a single scanner may capture the entire periphery of a log 10.

The machine tool 100, 101, 102 may either be a fixed installation, or alternatively may comprise a mobile machine tool 100, 101, 102 that may be transported on a trailer to a job site. In an embodiment, the machine tool 100, 101, 102 may comprise a communication link for communicating log measurements to a CAD/CAM station remote from the job site.

In the embodiments of FIGS. 4, 5*a* and 5*b*, the machine tool 100, 101, 102 comprises a scanning subsystem and a machining subsystem. In alternate embodiments the scanning subsystem and machining subsystem may comprise separate subsystems that may optionally be located at different physical locations.

In an embodiment the machine tool 100, 101, 102 may comprise a machining subsystem that is capable of machining logs according to cutting profiles provided by a CAD subsystem that may be remote from the location of the machining subsystem. The machining subsystem may be mobile to allow relocation to a construction site. The CAD subsystem may communicate with the machining subsystem either through a communication link, or else by transporting instructions to the machining subsystem on a medium such as a CD or DVD.

In an embodiment the logs 10 may be positioned in the machine tool 100, 101, 102 in any order and each log 10 may be scanned and matched to a virtual log from a CAD model of a planned log structure. In this embodiment logs 10 need not be scanned and cut in the order of assembly of the log structure as is currently the case. Instead, logs 11 may be scanned and cut in any order, simplifying physical handling of the logs 11 and avoiding the need to sort through the logs 11 before supplying them to the machine tool 100, 101, 102.

In an embodiment the model may be adjusted to add or remove logs 10 as necessary to accommodate logs 10 of differing dimensions from the model's ideal virtual logs 11. In a further embodiment, the machined bearing edges 27 and machined edges of contact may be machined within a range of dimensions to provide further accommodation of differences between dimensions of a virtual log and the actual log 10 being machined.

In an alternate embodiment, the logs 10 may first be scanned to create a plurality of scanned logs, each scanned log comprising scanned measurements of dimensions of a log 10. A plan may then be created by assembling the scanned logs and making virtual cuts in the scanned logs in a CAD/CAM program. The plan may then be converted into a plurality of cutting profiles, at least one cutting profile for each log 10 and corresponding scanned log. This alternate embodiment allows a model log home to be designed using the scanned measurements of actual logs, as opposed to fitting and cutting actual logs into pre-planned log dimensions or having to adjust a pre-designed CAD model to accommodate the dimensions of actual logs. In one embodiment the machine tool 100, 101, 102 may include a communications link and measurements taken by the machine tool 100, 101, 102 are transmitted over the communications link to a CAD/CAM station geographically remote from the machine tool 100, 101, 102.

Where a plan is created from virtual logs, the actual logs 10 must be assigned to a virtual log and identified for cutting. In an embodiment, each log 10 may be assigned an individual identifier during scanning and both the virtual log and the log identifier is communicated to the CAD/CAM program. The cutting profile for the log 10 is associated with the log identifier. During machining, the machine tool 100, 101, 102 may specify a particular log 10 to be loaded according to its log identifier. Preferably, however, any of the logs 10 may be loaded and the associated log identifier entered at the machine tool 100, 101, 102. The machine tool 100, 101, 102 may then machine the loaded log 10 according to the cutting profile associated with the entered log identifier.

Preferably, the machine tool 100, 101, 102 will re-scan a newly loaded log 10 to reference the location and orientation of the loaded log 10. The re-scanned log may be compared to the previously scanned log and the cutting profile adjusted by rotating or translating the frame of reference to coincide with the current position of the log 10. In an embodiment the log identifier may comprise the scanned surface of the log 10, and the log identifier is entered at the machine tool 100, 101, 102 by loading the log 10 and scanning the log 10. In this embodiment, the log identifier may comprise a score or fingerprint calculated from the scanned results. The score or fingerprint may, for instance, comprise a plurality of measurements taken at points about the log. Alternatively, for instance, the score or fingerprint may comprise the slope of one or more vectors perpendicular to the surface of the log 10. Other metrics may also be employed to create such a score or fingerprint.

The measurements of the re-scanned log may be compared to measurements of previously scanned logs, for instance by comparing the score or fingerprint of the scanned logs, to positively identify the re-scanned log with an associated cutting profile.

FIG. 6 illustrates an ideal virtual log 11 intended to be included in a model for a log home. The virtual log 11 has a circular cross-section and intended bearing edges 17a and edges of contact 19 to match adjacent virtual logs 11 within the model. The model may be designed as a computer model comprised of an assembly of virtual logs 11 cut as necessary.

FIG. 7a illustrates a cross-section through two adjacent virtual logs 31, 33 as arranged in a model. Ideal edges of contact 35 and bearing edges 36 are illustrated as engaging at the hollow circles. FIG. 7b illustrates a scanned log 30 superimposed as a heavy line over the lower virtual log 31 (shown in stippled lines). As illustrated the intended bearing edges 37 no longer match the ideal edges of contact 35 of the upper virtual log 33. FIG. 7c illustrates the fit of the upper virtual log 33 with the lower scanned log 30. As illustrated the edges of contact 35 no longer match the intended bearing edges 37 of the lower scanned log 30. FIG. 7d illustrates an upper scanned log 32 positioned in place above the lower scanned log 30. The ideal virtual logs 31, 33 are illustrated in stippled lines for reference purposes. As illustrated, the actual edges of contact 38 are now aligned with the bearing edges 37 of the lower scanned log 30.

According to an embodiment the adjustments of FIGS. 7a-7d may be achieved through adjusting the model as logs 10 are scanned by a machine tool 100, 101, 102. Further, the log home model as a whole may be adjusted to accommodate the dimensions and profiles of individual logs 10. In a preferred embodiment both the cut face 18 and the bearing face 16 of the logs 10 may be machined to provide additional flexibility in accommodating the dimensions of actual logs 10 in the model in place of the dimensions of the ideal virtual logs.

FIG. 8 illustrates a cross section through a log 10 as it is being scanned by a scanner 110. FIG. 8 illustrates the machine tool 101 embodiment where opposing faces of a log 10 may be scanned at the same time. FIG. 8 illustrates an ideal virtual log 11 and an ideal virtual log 11 cross-section as stippled lines. The actual log 10 is shown in a solid line deviating from the cross-section of the ideal virtual log 11. The scanning process creates a pair of scanned surfaces which correspond to the bearing face 16 and cut face 18 of the log 10. The scanned surfaces of the log 10 may be matched to plan surfaces of a virtual log 11 from the CAD model. A difference between each of the scanned surfaces and the plan surfaces may be calculated. The difference may be used to create an adjusted cutting profile to accommodate the actual log 10.

While the above description has focussed on the cuts required for the walls, logs may be prepared for other components of the log home including the roof, stairs and floor. The cuts required for the walls are particularly suited for automation as the manual cuts involve time-consuming scribing, matching and finishing along the length of each log. Furthermore, the logs must be positioned in place in order to scribe and then relocated to carry out the cuts. Ceiling joists are also time consuming when carried out manually as they must be semi-erected in order to match the logs to complete the joints. Similarly, cuts to provide for window openings, interior wall cabinet fixing surfaces or other wooden components of a finished home may be included in the logs in addition to the joints and channels described above.

In an embodiment, the logs may be scribed by a machine tool, using a cutter, laser, water jet or other means. The cuts may be left for a worker in the field to perform using the scribe marks on the logs. While this embodiment still requires skilled workers to cut and finish the logs, it saves a great deal of time and effort as the laborious scribing and repositioning of each log is avoided. In an embodiment some cuts are made by the machine, but others, such as door openings, are scribed on the log for a worker to finish on-site. Such an embodiment allows for changes in detail on-site while automating the most laborious and time-consuming aspects of the construction process.

Figure 9:
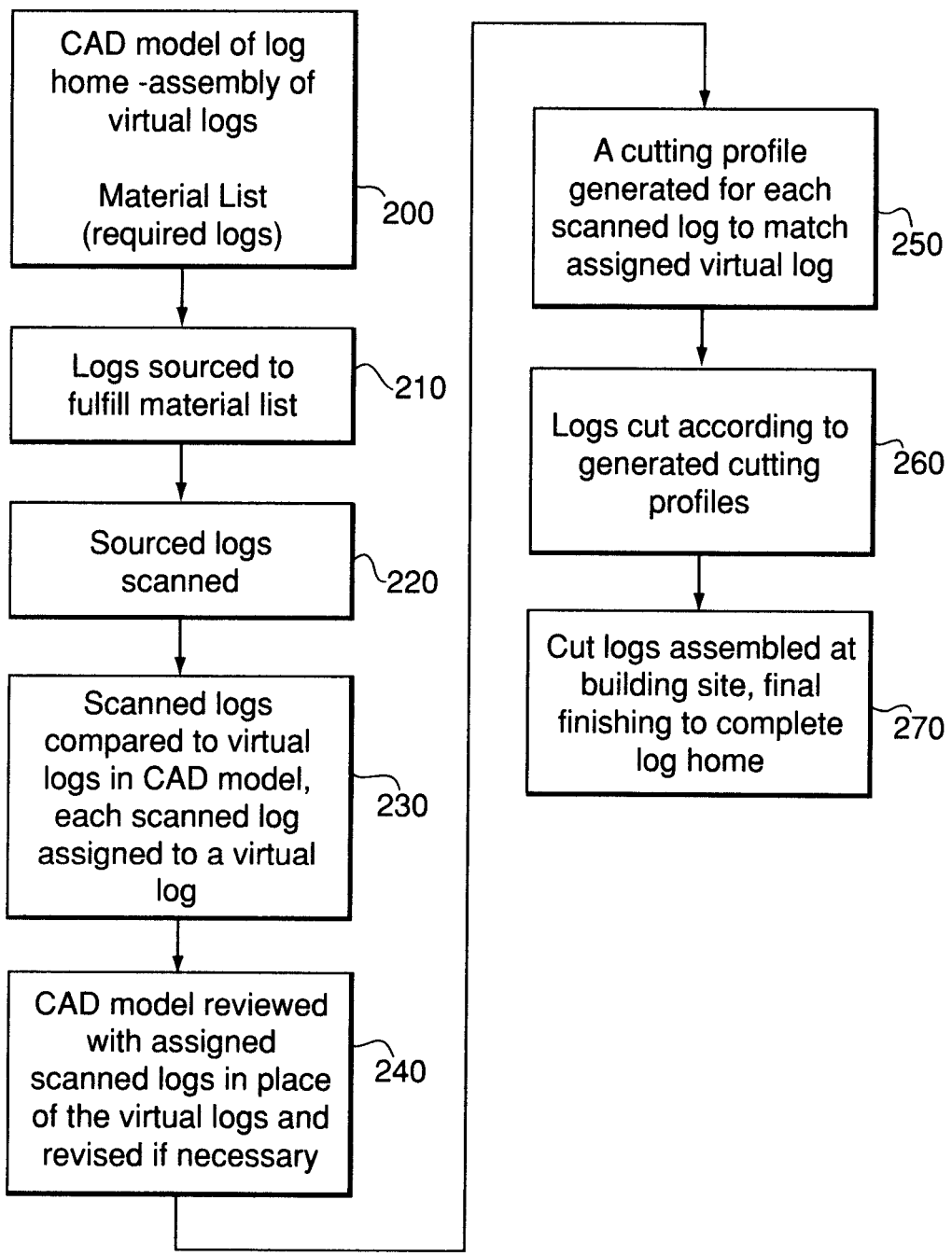
FIG. 9 illustrates an embodiment of a process for cutting logs.

FIG. 9 illustrates an embodiment of the method wherein a CAD model of a log home is generated, logs are scanned and then the CAD model may be amended to accommodate the actual sourced logs. Such an embodiment may be useful, for instance, where a common CAD model is being used for multiple log homes. As illustrated in FIG. 9, a CAD model of a log home is generated 200, comprising an assembly of virtual logs. A material list may be created from the model to identify the logs required to create the log home. Logs may then be sourced 210 to fulfill the material list. The sourced logs may then be scanned 220. The scanned logs may be compared to the virtual logs in the CAD model and each scanned log assigned to a virtual log 230. The CAD model may then be reviewed 240 by virtually replacing the virtual logs with the assigned scanned logs. If the differences between the virtual logs and the assigned scanned logs are within a pre-determined parameter then changes may not be required. If the differences between the virtual logs and the assigned scanned logs are beyond a pre-determined parameter then changes may be required. Either some of the assigned scanned logs may be replaced with logs that are better matches to the virtual logs and/or, the CAD model may be revised to accommodate the assigned scanned logs. Depending upon the scale of the differences between a virtual log and its assigned scanned log, it may be necessary to combine the two options: revise the CAD model and replace/re-assign some of the assigned scanned logs. Once the differences between the CAD model and the assigned scanned logs have been resolved a cutting profile may be generated for each assigned scanned log 250. The assigned scanned logs may then be cut according to the generated cutting profiles 260. The cut logs may be assembled at the building site 270. Final hand finishing and construction may be required to complete the log home.

Figure 10A:
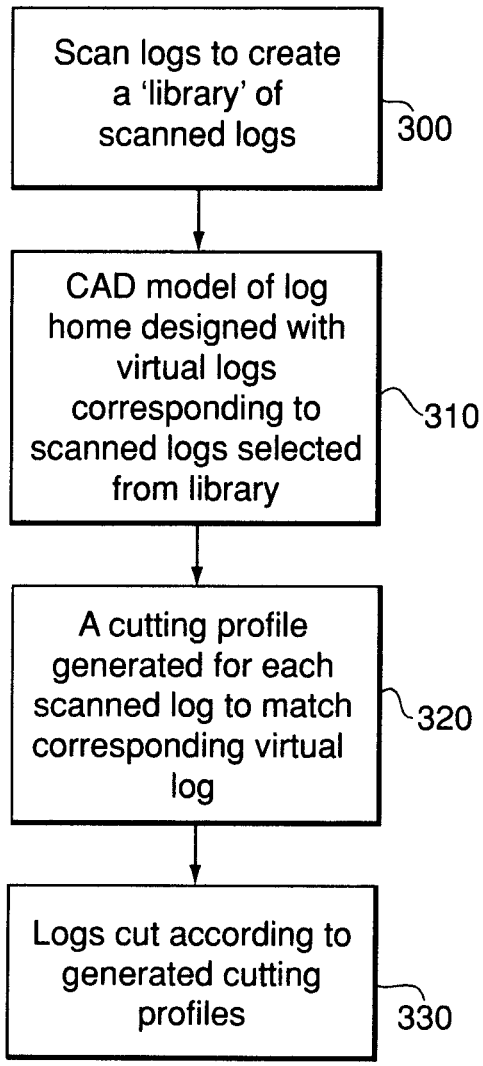
FIGS. 10a and 10b illustrate an alternate embodiment of a process for cutting logs.

FIG. 10*a* illustrates an embodiment of the method wherein logs are scanned to create a 'library' of scanned logs. Preferably, each log is marked with an identifier and the scan of the log is stored along with its identifier in a database. An identifier, such as a bar code or alphanumeric code, may be affixed to the log or alternatively may be imprinted on the log, for instance by water jet, burning, ink jet or other means. Alternatively, as described above, the log may be identified by matching its scanned measurements to previously scanned measurements. A CAD model of a log home may be designed using virtual logs having dimensions corresponding to the dimensions of actual scanned logs. Such an embodiment may be useful, for instance, where logs are peeled and scanned at a central facility in the off-season for subsequent machining and assembly in the summer.

As illustrated in FIG. 10*a*, the logs may be scanned to create a 'library' of scanned logs 300. Preferably each scanned log is marked with an identifier to assist in subsequent identification of the physical log with its associated virtual log stored in the library. A CAD model may then be designed using virtual logs corresponding to the scanned logs selected from the library 310. A cutting profile may be generated for each scanned log to match the corresponding virtual log 320. The cutting profile is associated with the identifier of the log. The logs may then be cut according to the generated cutting profile associated with the identifier of each log 330.

Figure 10B:
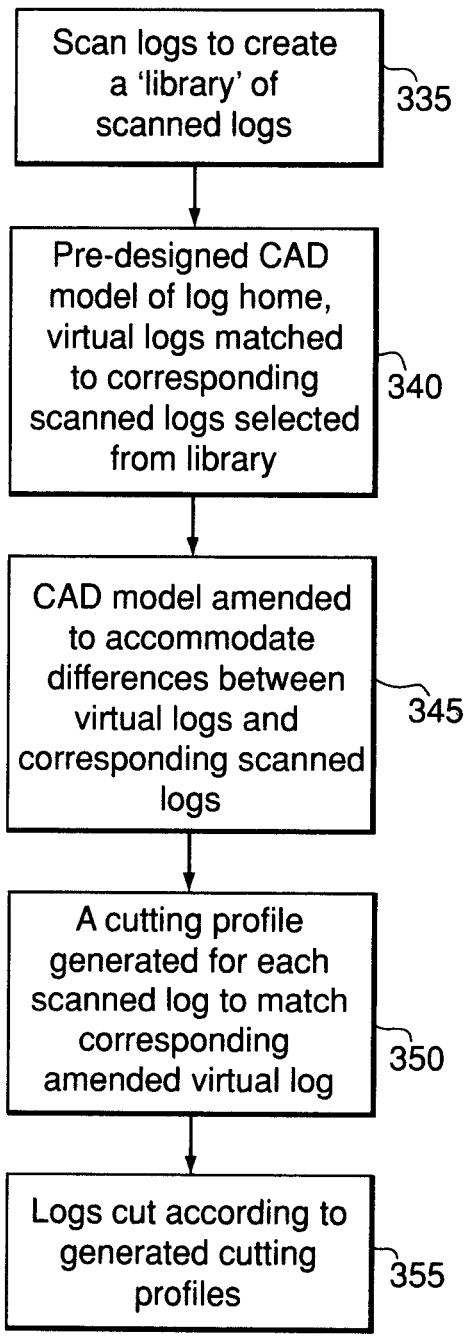

FIG. 10*b* illustrates an embodiment where the log 'library' may be used in conjunction with a pre-designed CAD model. As illustrated in FIG. 10*b*, the logs are scanned to create a 'library' of scanned logs 335 and associated with an identifier as described above. Preferably the 'library' contains more scanned logs than necessary for single log home to provide better selection of logs to correspond to the virtual logs in the pre-designed CAD model. After the logs are scanned, the virtual logs in the pre-designed CAD model are matched to corresponding scanned logs selected from the library 340. The CAD model is reviewed and amended if necessary to accommodate differences between the virtual logs and corresponding scanned logs 345. Differences outside a pre-determined parameter are flagged for review and possible replacement of the associated scanned log. After the CAD model and matched scanned logs have been finalised, a cutting profile may be generated for each scanned log to match the corresponding amended virtual log 350. The cutting profile is preferably associated with the identifier for the matched log. The logs may then be cut according to the generated cutting profiles 355.

FIG. 11 illustrates an embodiment where logs are scanned and cut in a single operation. As illustrated, a log is scanned 400. The scanned log is matched to a corresponding virtual log in a CAD model of a log home 405. The CAD model is then amended, if necessary, to accommodate differences between the virtual log and the corresponding scanned log 410. Differences beyond a pre-determined parameter are flagged and, if necessary, the log may be rejected and a replacement log requested 410. A cutting profile is then generated for the scanned log to match the corresponding amended virtual log 415. The log is then cut according to the generated cutting profile 420. This process is repeated until all virtual logs in the CAD model have been matched to scanned logs.

Figure 12A:
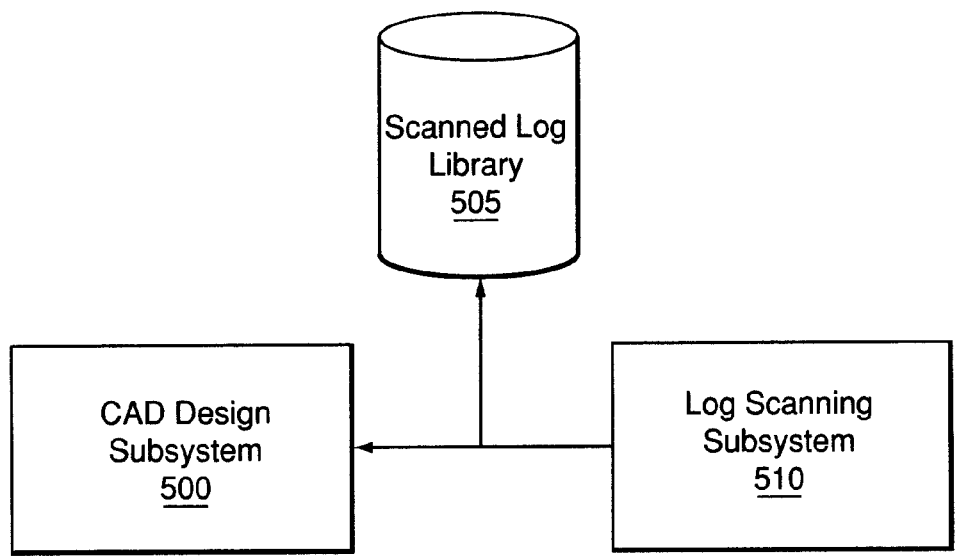
FIGS. 12a, 12b and 12c illustrate an embodiment of a system.
Figure 12B:
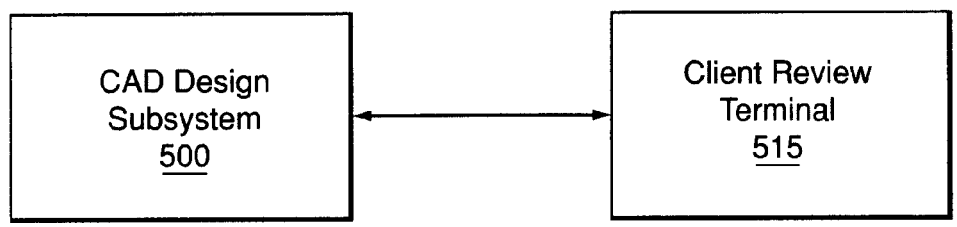
Figure 12C:
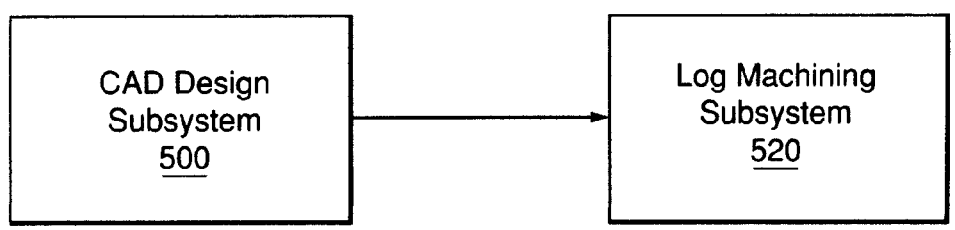

FIGS. 12*a*, 12*b* and 12*c* illustrate an embodiment of a system for scanning and machining logs. As illustrated in FIG. 12*a*, a log scanning subsystem 510 scans logs and communicates the information to a CAD design subsystem 500 and/or a scanned log library 505. As will be appreciated, the library 505 may be part of one of the subsystems, but is illustrated separately in the Figures for clarity.

As illustrated in FIG. 12*b* a client may review the planned CAD model through a client review terminal 515 that communicates with the CAD design subsystem 500. In a preferred arrangement the CAD design subsystem 500 provides a secure web portal to allow a client to review the model through a web browser connected to the Internet.

As illustrated in FIG. 12*c*, the CAD design subsystem 500 sends the cutting profiles generated from the CAD model to a log machining subsystem 520. As described above the log machining subsystem 520 and the log scanning subsystem 510 may comprise a single machine tool 100, 101, 102. Alternatively, the log scanning subsystem 510 and the log machining subsystem 520 may comprise separate tools.

Figure 13A:
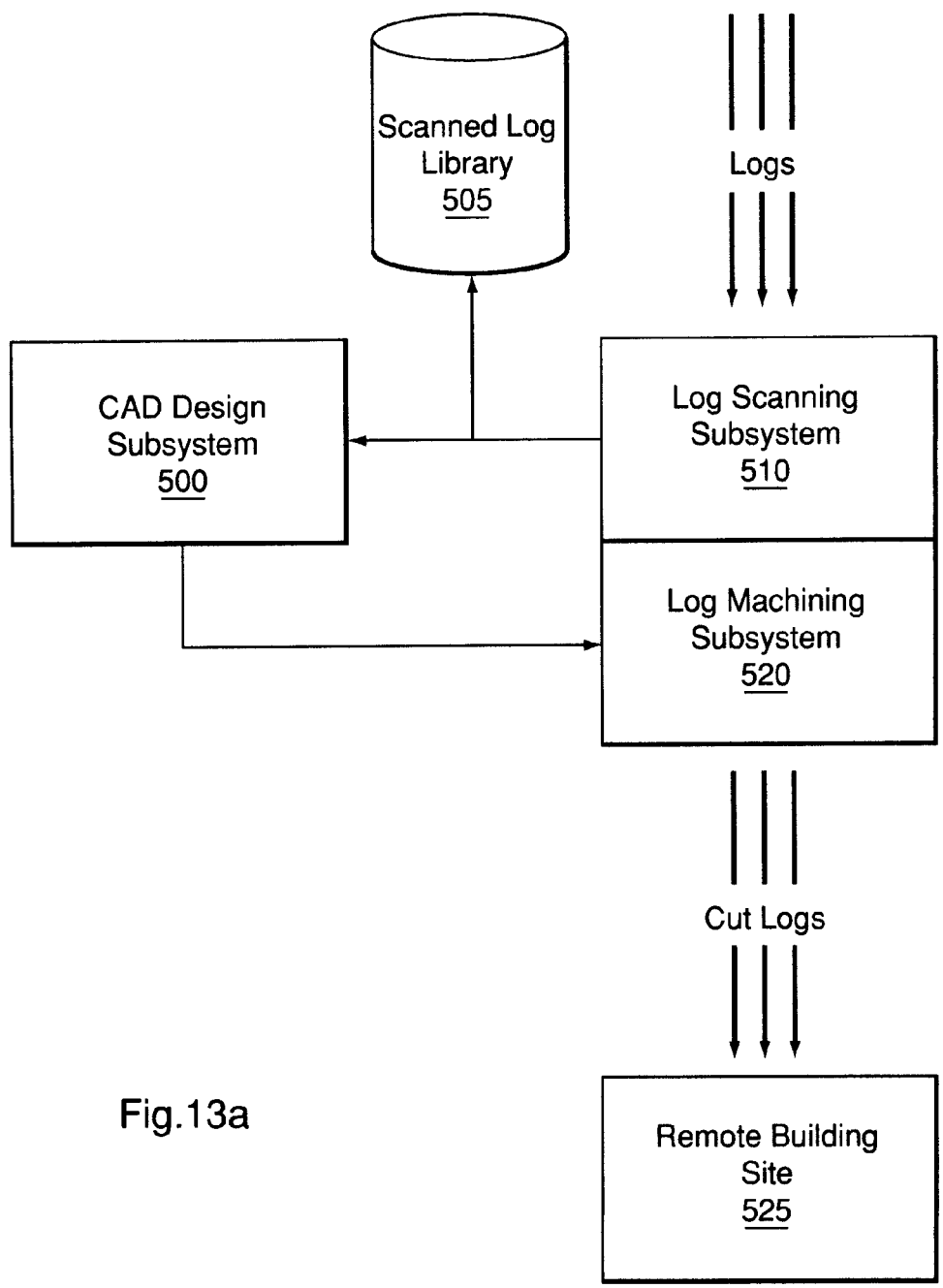
FIGS. 13a, 13b and 13c illustrate embodiments of a system and method.

FIG. 13*a* illustrates an embodiment where the log scanning subsystem 510 and the log machining subsystem 520 are located at the same location, for instance a central processing facility. As illustrated in the embodiment of FIG. 13*a*, peeled logs are scanned by the log scanning subsystem 510. The scanned logs are communicated to a scanned log library 505 or directly to the CAD design subsystem 500. The CAD Design Subsystem generates cutting profiles which are communicated to the log machining subsystem 520 which cuts the logs according to the profiles. The cut logs may then be transported to a remote building site for assembly. As described above, the logs may be scanned and cut in a single operation. Alternatively, the logs may first all be scanned into the library and then cut in a separate subsequent operation.

Figure 13B:
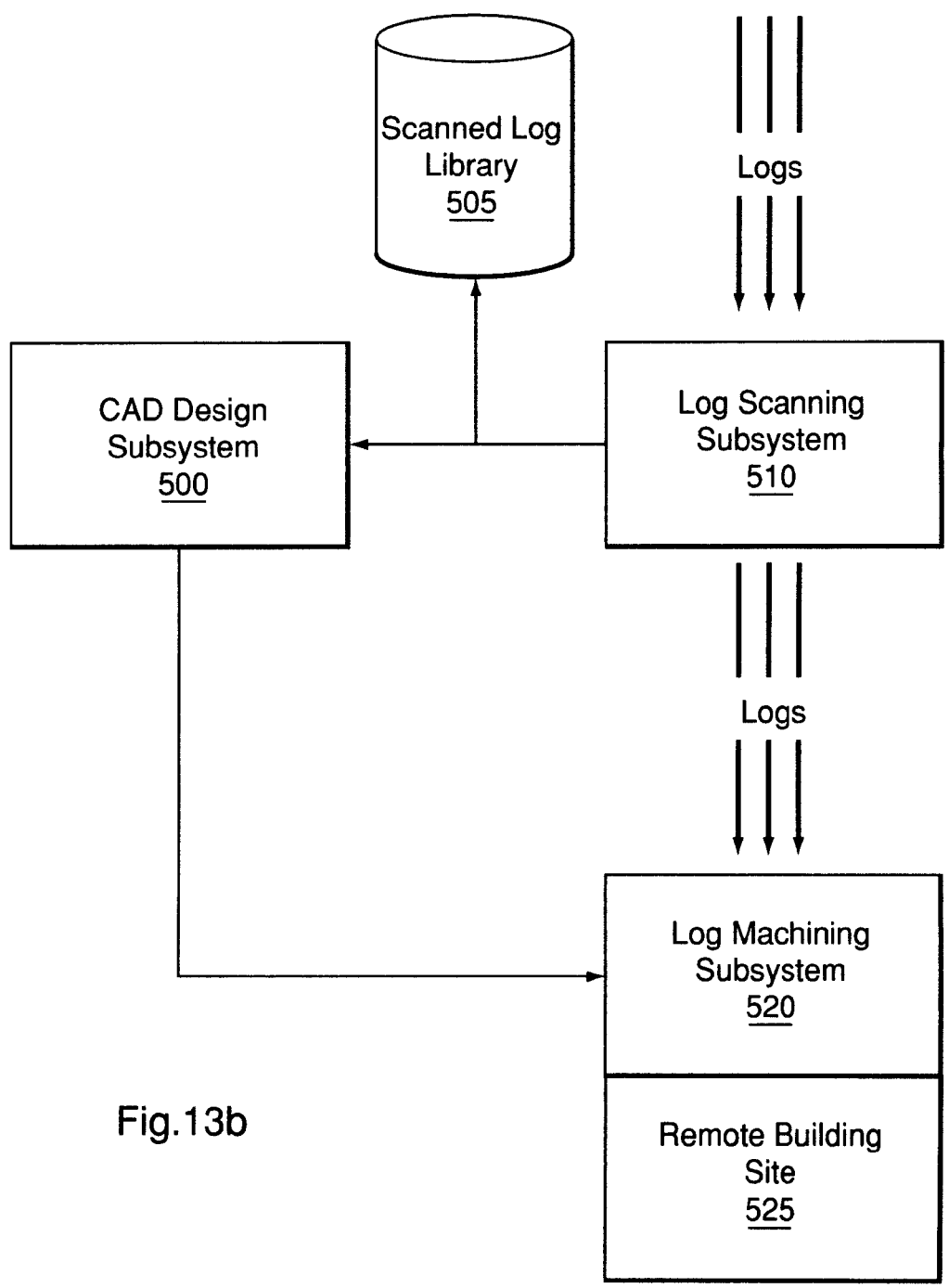

FIG. 13*b* illustrates an embodiment where the log scanning subsystem 510 and the log machining subsystem 520 are located at different locations, for instance the log scanning subsystem 510 is located at one location and the log machining subsystem 520 is located at a second location. In the embodiment of FIG. 13*b*, the log machining subsystem 520 is intended to be mobile and is situated at the remote building site 525. As illustrated in FIG. 13*b*, peeled logs may be scanned, for instance at a central processing facility and then transported to the remote building site 525. The CAD design subsystem 500 then communicates the cutting profiles to the log machining subsystem 520 at the remote building site 525. In an embodiment the CAD model is first finalised and then logs are selected from inventory matching the assigned scanned logs for shipment to the remote building site 525. Thus, the number of logs scanned and the number of logs transported may be different.

Figure 13C:
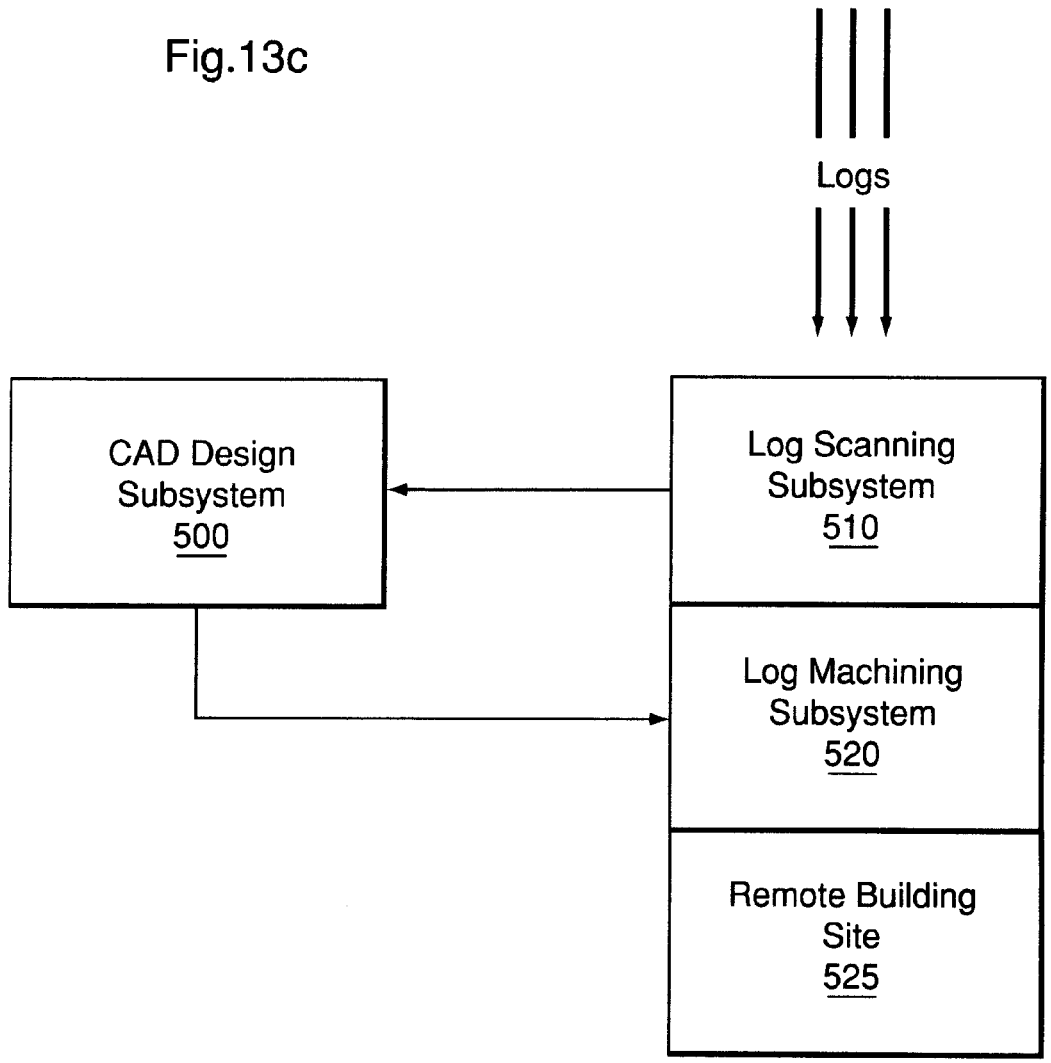

FIG. 13*c* illustrates an embodiment where both the log scanning subsystem 510 and the log machining subsystem 520 are located at the remote building site 525, for instance as a single machine tool 100, 101, 102. As illustrated in FIG.

13c, peeled logs may be input for scanning, matching to a virtual log and machining at the remote building site 525.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A method of preparing a log comprising:
   scanning the log;
   matching the scanned log to a virtual log, the virtual log comprising one of a plurality of virtual logs in a CAD model of a log structure;
   amending the CAD model to accommodate differences between the scanned log and the virtual log;
   generating a cutting profile for the scanned log from the matched virtual log;
   cutting the log in accordance with the generated cutting profile.

2. The method of claim 1 wherein a plurality of logs are each scanned and matched to a corresponding virtual log from the plurality of virtual logs.

3. The method of claim 1 wherein the CAD model is designed before the log is scanned and wherein the method further comprises amending the CAD model to replace the matched virtual log with the scanned log.

4. The method of claim 1 wherein after the log is scanned, transporting the log to a building site for cutting.

5. A method for preparing a log structure including a plurality of logs, the method comprising:
   scanning the logs, at a scanning substation, to create a set of scanned logs;
   communicating the scanned logs to a remote CAD subsystem;
   generating a cutting profile associated with each log;
   communicating the cutting profiles to a machining subsystem remote from the CAD subsystem;
   cutting, at the machining subsystem, each of the logs according to the associated cutting profile; and,
   assembling the log structure with the cut logs.

6. The method of claim 5 wherein the logs are scanned in a different order from their assembly in the log structure.

7. The method of claim 5 wherein the logs are cut in a different order from their assembly in the log structure.

8. The method of claim 5 wherein the cutting profile comprises a scribing profile and the step of cutting the log comprises scribing the log according to the scribing profile and then cutting log according to the scribing.

9. A method for preparing a log structure by preparing a plurality of logs using the method of claim 1, and assembling the log structure with the plurality of prepared logs.

10. The method of claim 5 wherein after assembling the log structure, the method further comprises selecting one of the cut logs for replacement;
    matching a replacement log with the cutting profile associated with the selected log; and, cutting the replacement log according to the matched cutting profile.

11. The method of claim 5 wherein the scanning substation is remote from the machining substation.

12. The method of claim 5, wherein after scanning the logs, the method further comprises transporting the scanned logs to a building site.

13. The method of claim 12, wherein the transporting occurs after the cutting at the machining subsystem.

14. The method of claim 5 wherein the machining subsystem is located at the building site.

15. The method of claim 5 wherein the machining subsystem is located at the scanning subsystem.

16. The method of claim 5, wherein after cutting the logs, the method further comprises transporting the cut logs to a building site.

17. The method of claim 5, wherein the scanning subsystem and the machining subsystem comprise a single machine tool.

18. The method of claim 5, wherein each log is assigned a log identifier at the scanning subsystem, and wherein each log identifier is communicated with the corresponding associated scanned log to the CAD subsystem, and wherein each cutting profile is communicated with the corresponding log identifier to the machining subsystem, and wherein the method further comprises associating each scanned log with the received log identifier, and cutting that scanned log with the cutting profile associated with that received log identifier.

* * * * *